(12) United States Patent
Inoue et al.

(10) Patent No.: US 6,217,789 B1
(45) Date of Patent: *Apr. 17, 2001

(54) MN-ZN SYSTEM FERRITE

(75) Inventors: Shoji Inoue; Masahiko Watanabe, both of Chiba (JP)

(73) Assignee: TDK Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,110

(22) Filed: Nov. 13, 1998

Related U.S. Application Data

(63) Continuation of application No. PCT/JP98/01054, filed on Mar. 13, 1998.

(30) Foreign Application Priority Data

Mar. 13, 1997 (JP) .................................... 9-079020
Mar. 14, 1997 (JP) .................................... 9-081871

(51) Int. Cl.$^7$ .................................................. C04B 35/38
(52) U.S. Cl. ..................................... 252/62.62; 252/62.63
(58) Field of Search ............................... 252/62.62, 62.63

(56) References Cited

U.S. PATENT DOCUMENTS

| | | |
|---|---|---|
| 5,498,361 | 3/1996 | Matsukawa et al. . |
| 5,779,930 | 7/1998 | Inoue . |
| 5,846,448 | 12/1998 | Yasuhara et al. . |

FOREIGN PATENT DOCUMENTS

| | | |
|---|---|---|
| 6-263447 | 9/1994 | (JP) . |
| 9-165220 | 6/1997 | (JP) . |

*Primary Examiner*—C. Melissa Koslow
(74) *Attorney, Agent, or Firm*—Oblon, Spivak, McClelland, Maier & Neustadt, P.C.

(57) ABSTRACT

The Mn—Zn system ferrite according to the present invention contains main components comprising manganese oxide, zinc oxide and iron oxide, and subordinate components comprising bismuth oxide and molybdenum oxide. It comprises 22.0 to 25.0 mol % c of manganese oxide calculated as MnO, 22.0 to 25.0 mol% of zinc oxide calculated as ZnO and the remainder calculated as $Fe_2O_3$ in main components. It has been sintered after adding thereto 50 to 400 ppm of a bismuth oxide component calculated as $Bi_2O_3$ and 50 to 400 ppm of a molybdenum oxide component calculated as $MoO_3$ as subordinate component source materials. An initial magnetic permeability at 10 KHz is 8,500 or more at −20 to 20° C. and 10,000 or more at 20 to 100° C., and the temperature characteristics of magnetic permeability is excellent.

23 Claims, 1 Drawing Sheet

MN-ZN SYSTEM FERRITE

This application is a continuation application of PCT/JP98/01054, filed on Mar. 13, 1998.

FIELD OF THE INVENTION

The present invention relates to a Mn—Zn system Ferrite having a high magnetic permeability with its excellent temperature characteristics.

BACKGROUND ART

The Mn—Zn system ferrite is used as a magnetic core for transformers and noise filters since it has the high magnetic permeability.

A pulse transformer used in S/T point interface of ISDN is sometimes installed in the open air when used for public telephones and digital service units (DSU). Therefore, the pulse transformer is required to have temperature compensation in the range from low to high temperature.

However, in case of the conventional Mn—Zn system ferrite, the initial magnetic permeability remarkably decreases in the low temperature range (−20 to 20° C.). For this reason, in order to maintain the inductance at the low temperature range, it was necessary to increase a number of winding or to use a ferrite which is higher than necessary in the initial magnetic permeability at a normal temperature so that the initial magnetic permeability increases at the low temperature range. Hence, such a ferrite was not efficient at all.

DISCLOSURE OF THE INVENTION

An object of the present invention is to provide a Mn—Zn system ferrite which maintains the high initial magnetic permeability in the wide range of temperature of −20 to 100° C.

This object is achieved by the present invention which is defined below as (1) to (8).

(1) A Mn—Zn system ferrite containing main components comprising manganese oxide, zinc oxide and iron oxide, and subordinate components comprising bismuth oxide and molybdenum oxide, said Mn—Zn system ferrite comprising 22.0 to 25.0 mol % of a manganese oxide component calculated as MnO, 22.0 to 25.0 mol % of a zinc oxide calcuated as ZnO component and the remainder calculated as $Fe_2O_3$ respectively in main components, and said Mn—Zn system ferrite having been sintered after adding thereto 50 to 400 ppm of a bismuth oxide component calculated as $Bi_2O_3$ and 50 to 400 ppm of a molybdenum oxide component calculated as $MoO_3$ as subordinate component source materials.

(2) The Mn—Zn system ferrite of the above (1), wherein the initial magnetic permeability at 10 KHz is 8,500 or more at −20 to 20° C. and 10,000 or more at 20 to 100° C.

(3) The Mn—Zn system ferrite of the above (1), comprising the ratio of $Fe_2O_3$ 52.5 to 53.8 mol % and the ratio of ZnO 22.5 to 24.5 mol % in main components.

(4) The Mn—Zn system ferrite of the above (3), wherein the initial magnetic permeability at 10 KHz is 9,000 or more at −20 to 20° C. and 11,000 or more at 20 to 100° C.

(5) The Mn—Zn system ferrite of the above (1), comprising the ratio of $Fe_2O_3$ 53.0 to 53.3 mol % and the ratio of ZnO 23.3 to 23.9 mol % in main components.

(6) The Mn—Zn system ferrite of the above (5), wherein the initial magnetic permeability at 10 KHz is 9,500 or more at −20 to 20° C. and 11,500 or more at 20 to 100° C.

(7) The Mn—Zn system ferrite as claimed in claim 1, comprising the ratio of $Fe_2O_3$ 52.6 to 53.8 mol % and the ratio of MnO 22.9 to 20.5 mol %.

(8) The Mn—Zn system ferrite as claimed in claim 7, wherein the initial magnetic permeability at 10 KHz is 12,000 or more at −20 to 100° C.

Function and Effect

According to the present invention, the bismuth oxide and the molybdenum oxide are contained in the Mn—Zn system ferrite and the contents of manganese oxide, zinc oxide and iron oxide as main components is within a given amount. Thus, a high initial magnetic permeability could be obtained within the range from low to high temperatures. That is why the Mn—Zn system ferrite according to the present invention is preferred, for example, for the pulse transformer used for S/T point interface of ISDN.

Now, it is to be noted that Japanese Patent Application Kokai No. 204025/1995 describes the technology wherein the high initial magnetic permeability can be obtained at the normal temperature by containing bismuth oxide and molybdenum oxide into the Mn—Zn system ferrite. However, there is no mention made of improvement of the initial magnetic permeability at the low temperature range of about −20 to 20° C. Besides, main components as described in the embodiments of said Patent are out of the scope of the present invention.

More, Japanese Patent Application Kokai No. 263447/1995 describes the Mn—Zn system ferrite, wherein $\mu i$ is 8,000 or more in the range of −20 to 100° C. and the ratio of variation thereof is within 70%. However, there is no description about one having the same performance, that is to say, as that of the Mn—Zn system ferrite of the present invention, wherein the initial magnetic permeability at 10 KHz is 8,500 or more at −20 to 20° C. and 10,000 or more at 20 to 100° C. Moreover, in the sample 25 as described in Table 2 of said publication, the initial magnetic permeability at 100 KHz is 8,500 or more at −20 to 20° C. and 10,000 or more at 20 to 100° C. However, 100 KHz is close to a critical frequency of the Mn—Zn system ferrite and the initial magnetic permeability only shows a high value since the resonance is generated in this vicinity. Hence, the initial magnetic permeability at 10 KHz becomes less than that according to the Mn—Zn system ferrite of the present invention. Moreover, there is no description about that, wherein the initial magnetic permeability at 10 KHz is 12,000 or more at −20 to 100° C.

THE PREFERRED EMBODIMENTS FOR IMPLEMENTING THE PRESENT INVENTION

Figure 1:
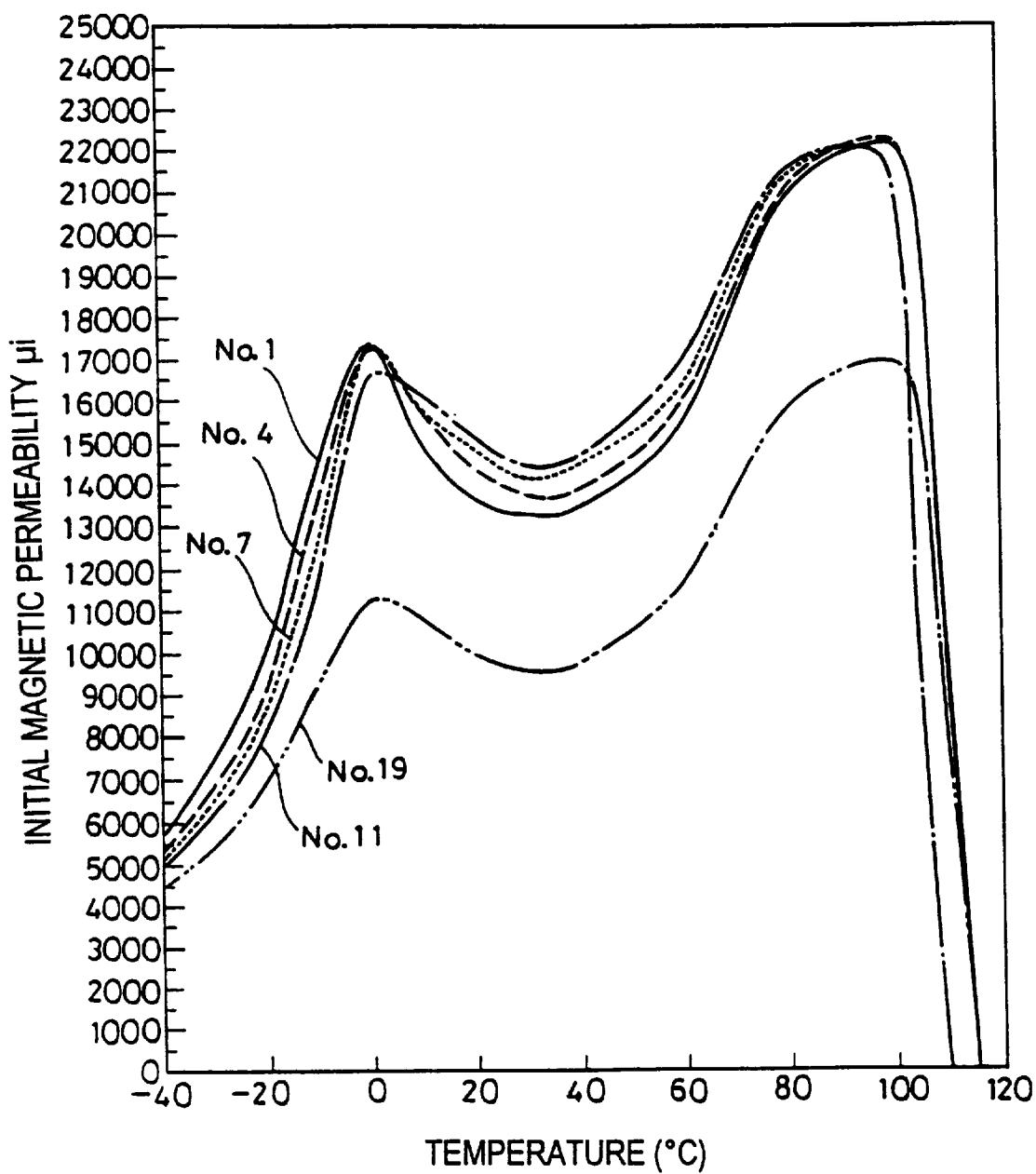
FIG. 1 is a graph showing the relationship between the initial magnetic permeability $\mu i$ and the temperature measured at a frequency of 10 KHz.

The Mn—Zn system ferrite according to the present invention has manganese oxide, zinc oxide and iron oxide as main components, which comprises the ratio of MnO 22.0 to 25.0 mol % calculated as MnO of manganese oxide, the ratio of ZnO 22.0 to 25.0 mol % calculated as ZnO of zinc oxide and the remainder calculated as $Fe_2O_3$ respectively in main components.

The Mn—Zn system ferrite according to the present invention contains bismuth oxide and molybdenum oxide as subordinate components. These subordinate components are contained as a result of having been sintered after adding thereto bismuth oxide component 50 to 400 ppm calculated as $Bi_2O_3$ and molybdenum oxide component 50 to 400 ppm calculated as $MoO_3$. The addition amount of the bismuth oxide component and the molybdenum oxide component is expressed as ratio to main component.

With the above main and subordinate components contained, the Mn—Zn system ferrite of the present invention makes it possible for the initial magnetic permeability at 10 KHz to be 8,500 or more at −20 to 20° C. and 10,000 or more at 20 to 100° C.

The Mn—Zn system ferrite containing the bismuth oxide and the molybdenum oxide has two peaks in a temperature dependency curve of the initial magnetic permeability. When the high peak in the initial magnetic permeability is taken as a primary peak and the relatively low peak as a secondary peak, the primary peak exists in the high temperature region and the secondary peak exists in the low temperature region. When composition ratio of main component deviates from the above range, the secondary peak shifts largely toward the low temperature or high temperature region, as a result, the above flat initial magnetic permeability temperature characteristic can not be obtained. Also, when the addition amount of subordinate component deviates from the above range, crystal grain diameter can not be held within a preferable range and, as a result, no flat initial magnetic permeability temperature characteristic can be obtained.

Further by narrowing down the composition ratio of main components, it becomes possible for the secondary peak to be in a preferable position and more the flatter initial magnetic permeability temperature characteristic can be obtained. To put it concretely, by narrowing down the ratio of $Fe_2O_3$ to 52.5 to 53.8 mol % and the ratio of ZnO to 22.5 to 24.5 mol % in main components, the initial magnetic permeability at 10 KHz can be made 9,000 or more at −20 to 20° C. and 11,000 or more at 20 to 100° C. Also, by more-narrowing down the ratio of $Fe_2O_3$ to 53.0 to 53.3 mol % and the ratio of ZnO to 23.3 to 23.9 mol %, the initial magnetic permeability can be made 9,500 or more at −20 to 20° C. and 11,500 or more at 20 to 100° C.

Further, in the case of the Mn—Zn system ferrite according to the present invention, the lowest value of the initial magnetic permeability at −20 to 100° C. can be made 12,000 or more and, though different depending on the size of magnetic core, the lowest value can be increased to around 18,000.

It is preferable that the ratio of $Fe_2O_3$ is taken as 52.6 to 53.8 mol % and the ratio of ZnO is taken as 22.9 to 24.5 mol %, and it is further preferable that the ratio of $Fe_2O_3$ is taken as 53.1 to 53.3 mol % and the ratio of ZnO is taken as 23.4 to 24.0 mol %.

The Mn—Zn system ferrite according to the present invention usually contains calcium oxide and silicon oxide as subordinate components. The content of calcium oxide is preferably 50 to 500 ppm calculated as CaO, more preferably 100 to 300 ppm and the content of silicon oxide is preferably 50 to 150 ppm calculated as $SiO_2$.

Moreover, as subordinate components, for example, one kind or more kind of indium oxide, vanadium oxide, tantalum oxide, etc. may be contained. These contents are preferable in the total amount of about 0 to 3,000 ppm calculated as $In_2O_3$, $V_2O_5$, $Ta_2O_5$, etc.

A part of bismuth oxide component, molybdenum oxide component, and particularly molybdenum oxide component sometimes evaporates or sublimates after sintering. That is why the contents of bismuth oxide and molybdenum oxide in ferrite sometimes do not coincide with their addition amounts. The ratio of the content to the addition amount is different depending on the size of magnetic core. In the case of small magnetic core or thin magnetic core, the ratio of the content to the addition amount decreases. To put it concretely, the content of bismuth oxide in the ferrite is about 30 to 100% by weight calculated as $Bi_2O_3$ and the content of molybdenum oxide is about 10 to 100% by weight calculated as $MoO_3$, particularly 10 to 60% by weight.

The average crystal grain diameter according to the present invention is preferably 5 to 50 µm, more preferably 5 to 45 µm. High frequency characteristics of µi deteriorates even when the average crystal grain diameter is too large or too small. The mean crystal grain diameter may be determined as the mean diameters of circles converted from polycrystalline grains after etching of a mirror finished surface with acid observed under an optical microscope.

The Mn—Zn system ferrite according to the present invention is manufactured by furnishing usual iron oxide component, manganese oxide component and zinc oxide component as main component source materials, and also bismuth oxide component and molybdenum oxide component as subordinate component source materials. The bismuth oxide component used may be $Bi_2O_3$, or $Bi_2(SO_4)_3$, etc., preferably $Bi_2O_3$. More, the molybdenum oxide component used may be $MoO_3$, or $MoCl_3$, etc., preferably $MoO_3$.

Moreover, as subordinate component source materials, if needs arise, calcium oxide or compound (calcium carbonate, etc.) which will be converted to calcium oxide by firing and silicon oxide or compound which will be converted to silicon oxide by firing are furnished thereto. Note that, instead of these materials, those containing impure materials in main component source materials may be used.

Now, the above main component source materials are calcined at about 850 to 950° C. for about 5 minutes to 2 hours. The calcination may be carried out by atomized-firing. The thus obtained calcined body is added with bismuth oxide component and molybdenum oxide component, and mixed by pulverizing. When calcium oxide and silicon oxide or these source material compounds are added, these oxides or compounds may be added before and/or after the calcination. After the mixture, an appropriate binder, for example, such as polyvinyl alcohol is added thereto in a small amount, for example, 0.1 to 1.0% by weight, and the mixture thereof is converted to granules having a diameter of about 80 to 200 µm through a sprayer drier, etc.

Next, the thus obtained compact is sintered. The sintering is carried out by slowly heating the compact to a sintering temperature at a heating ratio of about 50 to 300° C./hr. under an atmosphere having a controlled oxygen concentration, the sintering being completed at that temperature. The sintering temperature is generally 1,250° C. or more, preferably in the range of 1,300 to 1,400° C. and a temperature holding time is preferably about 4 to 5 hours. After the completion of sintering, the compact is preferably cooled at a cooling rate of about 50 to 300° C./hr. under an atmosphere having a controlled oxygen concentration. During such cooling, it is preferred step by step or continuously to decrease the oxygen concentration to 1000° C. in balanced oxygen partial pressure of ferrite or in oxygen partial pressure below balanced oxygen partial pressure, and to decrease, below 1000° C., the temperature under nitrogen atmosphere.

PREFERRED EXAMPLES

Example 1

MnO, ZnO and $Fe_2O_3$ were furnished as main component source materials. These materials were mixed in the ratio as shown in Table 1 and the mixture were calcined at 900° C. for 30 minutes. The thus obtained calcined body was added with $Bi_2O_3$ and $MoO_3$ in the ratio as shown in Table 1 and mixed by pulverizing. Next, the mixture was molded after adding thereto a binder and granulated into granules having the mean granule diameter of 150 $\mu$m through a spray drier. The thus obtained compact was sintered by heating, holding at 1,400° C. for 5 hours and then lowering temperature, thereby obtaining toroidal core samples of 31 mm in outer diameter, 19 mm in inner diameter and 8 mm in height. The sintering was carried out under an atmosphere having a controlled oxygen concentration. When the temperature was lowered to 1,000° C., the oxygen concentration was reduced step by step in oxygen partial pressure below balanced oxygen partial pressure and, below 1,000° C., the temperature was lowered in nitrogen atmosphere.

The composition of samples was measured by a fluorescent x-ray method to find that the main components are corresponded with the source material compositions, the contents of $Bi_2O_3$ and $MoO_3$ being 40 to 60% by weight of their addition amounts. Note that the calcium oxide and the silicon oxide contained in main component source materials were present 100 ppm calculated as CaO and 70 ppm calculated as $SiO_2$ respectively.

For each sample was measured the initial magnetic permeability $\mu i$ at frequency 10 KHz and at −20 to 100° C. Note that an impedance analyzer was used for the measurement of permeability $\mu i$. The lowest value of $\mu i$ at −20 to 20° C. and the lowest value of $\mu i$ at 20 to 100° C. are shown in Table 1. In the samples shown in Table 1, an average diameter of crystalline grain of the present invention sample was 20 to 35 $\mu$m. More, for the part of samples shown in Table 1, the temperature $-\mu i$ curves are shown in FIG. 1.

The effectiveness of the present invention is evident from the data shown in Table 1. More particularly, in the samples of the present invention wherein both $Bi_2O_3$ and $MoO_3$ are added 50 to 400 ppm, the ratio of MnO is 22.0 to 25.0 mol % and the ratio of ZnO is 22.0 to 25.0 mol %, the $\mu i$ of no less than 8500 at −20 to 20 or no less than 10,000 at 20 to 100° C. is obtained. When the ratio of $Fe_2O_3$ is narrowed down to 52.5 to 53.8 mol % and the ratio of ZnO to 22.5 to 24.5 mol %, the $\mu i$ of no less than 9,000 at −20 to 20° C. or no less than 11,000 at 20 to 100° C. is obtained. Furthermore, when the ratio of $Fe_2O_3$ is narrowed down to 53.0 to 53.3 mol % and the ratio of ZnO to 23.3 to 23.9 mol %, the $\mu i$ of no less than 9,500 at −20 to 20° C. or no less than 11,500 at 20 to 100° C. is obtained.

It is evident from FIG. 1 that the $\mu i$ is low over the entire temperature range in the sample No. 19, wherein the addition amount of $Bi_2O_3$ is insufficient. Also, in the sample No. 11 wherein the ratio of the main component is outside the scope of the present invention, it is evident that the $\mu i$ at the low temperature is low since the secondary peak shifts to the high temperature.

Example 2

MnO and ZnO are furnished as main components. These components are mixed in the ratio as shown in Table 1 and the mixture was calcined at 900° C. for 30 minutes. The thus obtained calcined body was added with $Bi_2O_3$ and $MoO_3$ in the ratio as shown in Table 1 and mixed by pulverizing. Next, the mixture was molded after adding thereto a binder and granulated into granules having the mean granule diameter of 150 $\mu$m through a spray drier and then molded. The thus obtained compact body was sintered by heating, holding at 1400° C. for 5 hours and then lowing temperature, thereby obtaining toroidal core samples of 31 mm in outer diameter, 19 mm in inner diameter and 8 mm in height. The sintering was carried out under an atmosphere having a controlled oxygen partial pressure. When the temperature was lowered to 1,100° C., the oxygen concentration was reduced step by step in oxygen partial pressure below

TABLE 1

| Sample No. | Main components (mol %) | | | Subordinate components (ppm) | | The lowest value of $\mu i$ | |
|---|---|---|---|---|---|---|---|
| | $Fe_2O_3$ | ZnO | MnO | $Bi_2O_3$ | $MoO_3$ | −20 to 20° C. | 20 to 100° C. |
| 1 | 53.2 | 23.6 | 23.2 | 200 | 200 | 10100 | 13200 |
| 2 | 53.2 | 23.8 | 23.0 | 200 | 200 | 10200 | 11500 |
| 3 | 53.0 | 23.8 | 23.2 | 200 | 200 | 9600 | 13500 |
| 4 | 52.9* | 23.8 | 23.3 | 200 | 200 | 9200 | 13800 |
| 5 | 53.5* | 23.8 | 22.7 | 200 | 200 | 11800 | 11000 |
| 6 | 53.2* | 22.5* | 24.3 | 200 | 200 | 9000 | 13800 |
| 7 | 53.2 | 22.2** | 24.6 | 200 | 200 | 8700 | 14200 |
| 8 (comp.) | 52.9* | 21.9*** | 25.2*** | 200 | 200 | 5200 | 14900 |
| 9 (comp.) | 52.9* | 22.0** | 25.1*** | 200 | 200 | 7000 | 13100 |
| 10 (comp.) | 52.9* | 25.1*** | 22.0 | 200 | 200 | 7900 | 13500 |
| 11 (comp.) | 53.2 | 21.9*** | 24.9 | 200 | 200 | 8200 | 14500 |
| 12 (comp.) | 53.2 | 24.9** | 21.9*** | 200 | 200 | 14100 | 8500 |
| 13 (comp.) | 53.2 | 25.1*** | 21.7*** | 200 | 200 | 14200 | 8100 |
| 14 (comp.) | 53.5* | 21.9*** | 24.6 | 200 | 200 | 8100 | 13800 |
| 15 (comp.) | 53.5* | 25.1*** | 21.4*** | 200 | 200 | 11100 | 7500 |
| 16 (comp.) | 53.2 | 23.6 | 23.2 | 20*** | 20*** | 6200 | 8400 |
| 17 (comp.) | 53.2 | 23.6 | 23.2 | 200 | 20*** | 6600 | 8900 |
| 18 (comp.) | 53.2 | 23.6 | 23.2 | 200 | 1300*** | 3600 | 6700 |
| 19 (comp.) | 53.2 | 23.6 | 23.2 | 20*** | 200 | 7000 | 9600 |
| 20 (comp.) | 53.2 | 23.6 | 23.2 | 810*** | 200 | 4200 | 7500 |

***) the value outside MnO: 22.0 to 25.0 mol %, ZnO: 22.0 to 25.0 mol %
**) the value out of $Fe_2O_3$: 52.5 to 53.8 mol %, ZnO: 22.5 to 24.5 mol %
*) the value out of $Fe_2O_3$: 53.0 to 53.3 mol %, ZnO: 23.3 to 23.9 mol % balanced oxygen partial pressure of ferrite and, below 1,100° C., the temperature was lowered under nitrogen atmosphere.

The composition of samples was measured by a fluorescent x-ray method to find that the main component is corresponded with the source material compositions, and $Bi_2O_3$ and $MoO_3$ were 40 to 60% by weight of their addition amounts. Note that the calcium oxide and the silicon oxide contained in main component source materials were present 100 ppm as CaO and 70 ppm as $SiO_2$ respectively.

For each sample was measured the initial magnetic permeability $\mu i$ at frequency 10 kHz and at −20 to 100° C. Note that an impedance analyzer was used for the measurement of permeability. The lowest value of $\mu i$ at −20 to 100° C. is shown in Table 2. In the samples shown in Table 2, an average crystalline grain diameter of the present invention sample was 20 to 35 $\mu m$.

TABLE 2

| Sample No. | Main components (mol %) | | | Subordinate components (ppm) | | The lowest value of $\mu i$ | |
|---|---|---|---|---|---|---|---|
| | $Fe_2O_3$ | ZnO | MnO | $Bi_2O_3$ | $MoO_3$ | −20 to 20° C. | 20 to 100° C. |
| 1 | 53.2 | 23.6 | 23.2 | 300 | 300 | 12300 | 12500 |
| 2 | 53.2 | 23.8 | 23.0 | 300 | 300 | 12800 | 12100 |
| 3 (comp.) | 53.2 | 24.9 | 21.9* | 300 | 300 | 14000 | 8500* |
| 4 (comp.) | 52.9 | 22.0 | 25.1* | 300 | 300 | 7000* | 13000 |
| 5 (comp.) | 53.2 | 21.9* | 24.9 | 300 | 300 | 10000* | 10000* |
| 6 (comp.) | 52.9 | 25.1* | 22.0 | 300 | 300 | 8000* | 10500* |
| 7 (comp.) | 53.2 | 23.5 | 23.3 | 800* | 300 | 8500* | 8200* |
| 8 (comp.) | 53.3 | 23.7 | 23.0 | 20* | 300 | 7600* | 7500* |
| 9 (comp.) | 53.1 | 23.6 | 23.3 | 300 | 900* | 6900* | 6600* |
| 10 (comp.) | 53.2 | 23.7 | 23.1 | 300 | 20* | 8000* | 8300* |

*) the value out of the scope of the present invention

The effectiveness of the present invention is evident from the data as shown in Table 2. More particularly, in the sample of the present invention wherein both $Bi_2O_3$ and $MoO_3$ are added 50 to 400 ppm, the ratio of MnO is 22.0 to 25.0 mol % and the ratio of ZnO is 22.0 to 25.0 mol %, the $\mu i$ of no less than 12,000 at −20 to 100° is obtained.

What is claimed and desired to be secured by Letters Patent of the United States is:

1. A Mn—Zn system ferrite, containing main components comprising manganese oxide, zinc oxide and iron oxide, and subordinate components comprising bismuth oxide and molybdenum oxide, said Mn—Zn system ferrite comprising 22.0 to 25.0 mol % of manganese oxide component calculated as MnO, 22.0 to 25.0 mol. % of zinc oxide calculated as ZnO component and the remainder calculated as $Fe_2O_3$, respectively, in main components, and said Mn—Zn system ferrite having been sintered after adding thereto 50 to 400 ppm of a bismuth oxide component calculated as $Bi_2O_3$ and 50 to 400 ppm of a molybdenum oxide component calculated as $MoO_3$ as subordinate component source materials, wherein an initial magnetic permeability at 10 kHz is 8,500 or more at −20 to 20° C. and 10,000 or more at 20 to 100° C.

2. The Mn—Zn system ferrite of claim 1, comprising 52.5 to 53.8 mol % of said $Fe_2O_3$ and 22.5 to 24.5 mol % of said ZnO in main components.

3. The Mn—Zn system ferrite of claim 2, wherein an initial magnetic permeability at 10 kHz is 9,000 or more at −20 to 20° C. and 11,000 or more at 20 to 100° C.

4. The Mn—Zn system ferrite of claim 1, comprising 53.0 to 53.3 mol % of said $Fe_2O_3$ and 23.3 to 23.9 mol % of said ZnO in main components.

5. The Mn—Zn system ferrite of claim 4, wherein an initial magnetic permeability at 10 kHz is 9,500 or more at −20 to 20° C. and 11,500 or more at 20 to 100° C.

6. The Mn—Zn system ferrite of claim 1, comprising 52.6 to 53.8 mol % of said $Fe_2O_3$ and 22.9 to 20.5 mol % of said ZnO in main components.

7. The Mn—Zn system ferrite of claim 6, wherein an initial magnetic permeability of 10 kHz is 12,000 or more at −20 to 100° C.

8. The Mn—Zn system ferrite of claim 1, having an initial magnetic permeability at 10 kHz of 18,000 or more at −20 to 100° C.

9. The Mn—Zn system ferrite of claim 1, which further comprises about 50 to 500 ppm of CaO, and about 50 to 150 ppm of $SiO_2$.

10. A Mn—Zn system ferrite, containing main components comprising manganese oxide, zinc oxide and iron oxide, and subordinate components comprising bismuth oxide and molybdenum oxide, said Mn—Zn system ferrite comprising 22.0 to 25.0 mol % of manganese oxide component calculated as MnO, 22.5 to 24.5 mol % of ZnO calculated as ZnO component and 52.5 to 53.8 mol % of $Fe_2O_3$, respectively, in main components, and said Mn—Zn system ferrite having been sintered after adding thereto 50 to 400 ppm of a bismuth oxide component calculated as $Bi_2O_3$ and 50 to 400 ppm of a molybdenum oxide component calculated as $MoO_3$ as subordinate component source materials, wherein an initial magnetic permeability of 10 kHz is 9,000 or more at −20 to 20° C. and 11,000 or more at 20 to 100° C.

11. The Mn—Zn system ferrite of claim 10, comprising 53.0 to 53.3 mol % of said $Fe_2O_3$ and 23.3 to 23.9 mol % of said ZnO in main components.

12. The Mn—Zn system ferrite of claim 11, wherein an initial magnetic permeability of 10 kHz is 9,500 or more at −20 to 20° C. and 11,500 or more at 20 to 100° C.

13. The Mn—Zn system ferrite of claim 10, comprising 52.6 to 53.8 mol % of said $Fe_2O_3$ and 22.9 to 20.5 mol % of said ZnO in main components.

14. The Mn—Zn system ferrite of claim 13, wherein an initial magnetic permeability of 10 kHz is 12,000 or more at −20 to 100° C.

15. The Mn—Zn system ferrite of claim 10, having an initial magnetic permeability of 10 kHz of 18,000 or more at −20 to 100° C.

16. The Mn—Zn system ferrite of claim 10, which further comprises about 50 to 500 ppm of CaO about 50 to 150 ppm of $SiO_2$.

17. A Mn—Zn system ferrite, containing main components comprising manganese oxide, zinc oxide and iron oxide, and subordinate components comprising bismuth oxide and molybdenum oxide, said Mn—Zn system ferrite comprising 22.0 to 24.0 mol % of a manganese oxide component calculated as MnO, 23.3 to 23.9 mol % of a zinc oxide calculated as ZnO component and 53.0 to 53.3 mol % of $Fe_2O_3$, respectively, in main components, and said Mn—Zn system ferrite having been sintered after adding thereto 50 to 400 ppm of a bismuth oxide component calculated as $Bi_2O_3$ and 50 to 400 ppm of a molybdenum oxide component calculated as $MoO_3$ as subordinate component source materials, and wherein an initial magnetic permeability of 10 kHz is 9,500 or more at −20 to 20° C. and 11,500 or more at 20 to 100° C.

18. The Mn—Zn system ferrite of claim 17, wherein an initial magnetic permeability of 10 kHz is 12,000 or more at −20 to 100° C.

19. The Mn—Zn system ferrite of claim 17, having an initial magnetic permeability at 10 kHz of 18,000 or more at −20 to 100° C.

20. The Mn—Zn system ferrite of claim 17, which further comprises about 50 to 500 ppm of CaO, and about 50 to 150 ppm of $SiO_2$.

21. A Mn—Zn system ferrite, containing main components comprising manganese oxide, zinc oxide and iron oxide, and subordinate components comprising bismuth oxide and molybdenum oxide, said Mn—Zn system ferrite comprising 22.0 to 25.0 mol % of a manganese oxide component calculated as MnO, 22.9 to 20.5 mol. % of ZnO component and 52.6 to 53.8 mol. % of $Fe_2O_3$, respectively, in main components, and said Mn—Zn system ferrite having been sintered after adding thereto 50 to 400 ppm of a bismuth oxide component calculated as $Bi_2O_3$ and 50 to 400 ppm of a molybdenum oxide component calculated as $MoO_3$ as subordinate component source materials, wherein an initial magnetic permeability at 10 kHz is 12,000 or more at −20 to 100° C.

22. The Mn—Zn system ferrite of claim 21, having an initial magnetic permeability at 10 kHz of 18,000 or more at −20 to 100° C.

23. The Mn—Zn system ferrite of claims 21, which further comprises about 50 to 500 ppm of CaO, and about 50 to 150 ppm of $SiO_2$.

* * * * *